United States Patent
Le et al.

(10) Patent No.: US 8,802,814 B2
(45) Date of Patent: Aug. 12, 2014

(54) FINE POWDER OF BIOSOURCED ALIPHATIC POLYESTER AND PRODUCTION METHOD THEREOF

(75) Inventors: Guillaume Le, Colombelles (FR); Cyrille Mathieu, Rouen (FR); Karine Loyen, Pont-Audemer (FR); Jean Laurent Pradel, Boisney (FR); Jean Jacques Flat, Goupilleres (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/980,073

(22) PCT Filed: Jan. 20, 2012

(86) PCT No.: PCT/FR2012/050130
§ 371 (c)(1),
(2), (4) Date: Sep. 6, 2013

(87) PCT Pub. No.: WO2012/098340
PCT Pub. Date: Jul. 26, 2012

(65) Prior Publication Data
US 2013/0337025 A1    Dec. 19, 2013

(30) Foreign Application Priority Data
Jan. 20, 2011    (FR) ..................................... 11 50438

(51) Int. Cl.
*C08F 6/00* (2006.01)
*C08J 3/00* (2006.01)

(52) U.S. Cl.
USPC ......................................................... 528/502

(58) Field of Classification Search
USPC ........................................................ 528/502
See application file for complete search history.

(56) References Cited

U.S. PATENT DOCUMENTS

| 8,101,675 B2 | 1/2012 | Harris |
| 2003/0176633 A1 | 9/2003 | Noda et al. |
| 2004/0118007 A1 | 6/2004 | Chickering, III et al. |
| 2007/0126159 A1 | 6/2007 | Simon et al. |
| 2008/0293843 A1 | 11/2008 | Harris |

FOREIGN PATENT DOCUMENTS

| JP | 2007-197602 A | 8/2007 |
| WO | 2007/060470 A1 | 5/2007 |

OTHER PUBLICATIONS

International Search Report for PCT/FR2012/050130 (Mar. 13, 2012).
Database WPI Week 200768—Thomson Scientific, London, GB; AN 2007-722311 XP002651548.
Patent Abstracts of Japan for JP 2007-197602 A.

*Primary Examiner* — Terressa Boykin
(74) *Attorney, Agent, or Firm* — Millen, White, Zelano & Branigan, P.C.

(57) ABSTRACT

The invention relates to a method for the production of biosourced aliphatic polyester powder having a volume median diameter of less than 30 μm, comprising: a step consisting in supplying an aliphatic polyester having an inherent viscosity of less than 0.5 dl/g; and a step consisting in grinding the polyester, so as to obtain a polyester powder having a volume median diameter of less than 30 μm. The invention also relates to a powder in which the particles have a volume median diameter of less than 30 μm and are impregnated with a compound selected from among polyols and/or carboxylic acids. The invention further relates to the use of the powder for the production of cosmetic, pharmaceutical and perfume products.

15 Claims, No Drawings

FINE POWDER OF BIOSOURCED ALIPHATIC POLYESTER AND PRODUCTION METHOD THEREOF

The present invention relates to fine powders, such as those used in cosmetics, pharmaceuticals or perfumery. The present invention more particularly relates to a process for manufacturing a fine powder of aliphatic polyester derived from renewable, i.e. biosourced, materials.

For the purposes of the invention, the term "fine powder" means a powder with a volume-median particle diameter of less than 30 μm according to standard ISO 13319.

The processes existing for manufacturing polyester powders include milling processes and solvent processes such as dissolution of the polyester in a solvent followed by spray-drying, precipitation in a nonsolvent, emulsion polymerization or dispersion, in the melt, of the polyester in the form of nodules in a water-soluble polymer. Milling is generally preferred on account of its low cost, its simplicity and its ease of scale-up. The other processes require the use of solvents that are occasionally hazardous, which may leave traces of solvent in the powders obtained. Emulsion polymerization and dispersion of the polymer melt require meticulous control of the process, they may prove to be very energy-intensive and they generate effluents. Furthermore, dispersion methods may leave high concentrations of surfactant in the product.

The existing milling processes do not enable the simple milling of aliphatic polyesters in the form of fine powder, in particular high molecular weight polyesters (with a number-average molecular mass of greater than 30 000 g/mol), which are the only ones that are currently available in volumes compatible with industrial use. Documents US 2009/0 197 780 and US 2003/0 176 633 describe processes for milling aliphatic polyesters, which use, respectively, a harder additive (NaCl, quartz, KCl, $CaCl_2$ or KOH) or an abrasive based on ice at 0° C., as a mixture with the polymer. In the case of the additive, the mixture is prepared at a temperature close to the glass transition temperature of the polymer, and then cooled to obtain a fragile material that can be milled to obtain particles with a volume-median diameter in the range from 4 to 500 μm. In the case of the polymer mixed with an abrasive, the hard and fragile polymer, subjected to a high shear, may be milled more easily, and then dried in the case of ice, in order to obtain the polymer powder. These milling processes have several drawbacks: they require an additional step to separate the abrasive from the polymer, and it is difficult, or even impossible, to separate the abrasives from the polyester. Traces of abrasives may hamper the use of these powders, for example in cosmetics. Furthermore, in the use of ice, an additional step of drying the obtained product is necessary.

In the cosmetic field, the manufacture of fine powders derived from renewable, and preferably biocompatible and/or biodegradable materials, is of major interest. Starting materials of renewable source, derived from biomass, do not require all the energy-intensive refining steps of petroleum-based products and generally have a reduced impact on the environment. The production of $CO_2$ is reduced, and as such they contribute less toward climatic warming. Furthermore, consumers are increasingly drawn to such products of plant origin, which have the reputation of being safer and more compatible with the skin. It thus appears necessary to have available synthetic processes that are not dependent on starting materials of fossil origin, but rather that use starting materials of renewable origin.

A material of renewable origin, also known as a biomaterial, or alternatively a biosourced material, is a material derived from starting materials of renewable origin. The biomaterial content or biocarbon content of a material is determined by application of the standards ASTM D 6866 (ASTM D 6866-06) and ASTM D 7026 (ASTM D 7026-04).

Finally, ready-to-use starting materials, especially regarding powders and/or active agents, which are easy to incorporate into cosmetic formulations, are particularly sought by formulators.

The aim of the present invention is thus to provide a simple process (having the fewest possible number of steps) for manufacturing an aliphatic polyester powder that satisfies the various requirements stated above.

The Applicant has now found a process that is capable of producing such a fine powder of aliphatic polyester, including a production starting from high molecular weight commercial polyesters, said powder possibly comprising a variable degree of impregnation of certain compounds, its degree of impregnation being readily adjustable as a function of the conditions of the process.

One subject of the present invention is thus a process for manufacturing a biosourced aliphatic polyester powder with a volume-median diameter of less than 30 μm, preferably less than 20 μm and better still less than 10 μm.

A subject of the present invention is especially a process for manufacturing a biosourced aliphatic polyester powder impregnated with at least one compound chosen from polyols and/or carboxylic acids, said powder having a volume-median diameter of less than 30 μm.

The process according to the invention comprises:

a—a step of providing an aliphatic polyester with an inherent viscosity ($v_{inh}$) of less than 0.5 dl/g; and then b—a step of milling said polyester so as to obtain a polyester powder with a volume-median diameter of less than 30 μm.

For the purposes of the invention, the term "aliphatic polyester" means any biosourced aliphatic polyester or copolyester, in which the ester functions are separated by linear or branched hydrocarbon-based groups comprising at least 1 carbon atom. Processes for obtaining polyesters are well known. Mention may be made especially of the polycondensation of at least one diacid with one or more diol(s), the polycondensation of hydroxy acid(s), or the ring-opening polymerization of at least one cyclic ester or diester.

Preferably, the aliphatic polyester is chosen from:

PLAs: polylactic acids obtained by polycondensation of lactic acid or by ring opening of lactides (various isomers) including the stereocomplexes poly(D-lactic acid) and poly(L-lactic acid) obtained by mixing or in the form of block polymers;

copolymers of PLA with glycolic acid (or glycolide);

poly(hydroxycarboxylic acids) comprising polymerized units of one or more hydroxycarboxylic acids chosen from: 6-hydroxyhexanoic acid, 3-hydroxyhexanoic acid, 4-hydroxyhexanoic acid, 3-hydroxyheptanoic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid;

poly(ε-caprolactone);

aliphatic polyesters obtained by polycondensation of diols and of diacids such as poly(butylene adipate) and poly(butylene adipate-co-succinate);

and mixtures thereof.

Examples of aliphatic polyesters that are suitable for use in the invention are sold, for example, by NatureWorks (PLA), NaturePlast (PLA), by Mitsubishi Chemical (PBS and PBSA), Solvay and Dow (PLC), Telles (PHA).

Preferably, the number-average molecular mass (Mn) of the starting aliphatic polyesters used in the process of the invention, i.e. before milling, is less than 30 000 g/mol, preferably in the range from 10 000 to 30 000 g/mol, preferably from 10 000 to 25 000 g/mol, preferably from 10 000 to 20 000 g/mol. The number-average molecular mass (Mn) is measured by GPC (gel permeation chromatography), under the following conditions and with the following device: THF: 40° C., 1 ml/min, concentration 1 g/l, device: set of two Plgel Mixed B columns (30 cm). CAP-LCS-14, refractometric and UV detector, results (R1) given in eq. PS/results (V) given in eq. PLA, standard calculated in eq. PS—Universal: calculated in eq. PLA.

Specifically, according to the current regulation in certain countries such as Japan, the powders must have an Mn of at least 10 000 g/mol in order to be considered as polymer additives, for example in cosmetics; if these polymer powders have an Mn of between 1000 and 10 000 g/mol, they need to contain less than 1% by weight of oligomers with an Mn of less than 1000 g/mol. Conversely, polyesters with an Mn of greater than 30 000 g/mol are difficult to mill, or even impossible to mill as fine powders.

Preferably, step a of the process according to the invention comprises a step of depolymerization of an aliphatic polyester with an Mn of greater than 30 000 g/mol to obtain an aliphatic polyester with an inherent viscosity ($v_{inh}$) of less than 0.5 dl/g and/or an Mn of less than 30 000 g/mol.

Specifically, in order to be able to mill polyesters of this type with a high Mn ranging from 30 000 to 200 000 g/mol and in particular to obtain polyesters with an inherent viscosity of less than 0.5, the process of the invention may also comprise a preliminary milling step, which consists in depolymerizing the aliphatic polyester with an Mn of greater than 30 000 g/mol in order to obtain an aliphatic polyester with an inherent viscosity ($v_{inh}$) of less than 0.5 dl/g and/or an Mn of less than 30 000 g/mol.

The term "depolymerization" means the process which consists in reducing the molecular mass of the polyester to a value that enables the polyester to be milled in order to obtain a powder with a mean diameter of less than or equal to 30 microns.

To depolymerize the polyester, it is preferably subjected to melting and/or blending, so as to obtain a polyester oligomer with a lower molecular mass, of less than 30 000 g/mol. The melting and blending are preferably performed successively in this order, but may also be performed simultaneously. The more fluid the blended product becomes, the lower its number-average molecular mass. It turns out that this depolymerization step is essential in the case of polyesters of high Mn (greater than 30 000) in order to achieve an optimum viscosity of less than 0.5 dl/g, which value should not be exceeded in order to be able to obtain, after the process according to the invention, particles with a volume-mean diameter of less than 30 μm.

The depolymerization step according to the process of the invention is performed by blending a mixture comprising the polyester and 0.1% to 20% by weight and preferably from 1% to 15% by weight of a compound chosen from alcohols, preferably polyols, and/or carboxylic acids, relative to the total weight of the mixture.

The depolymerization step is performed at a temperature within the range:
  in the case of a semicrystalline polyester, at a temperature in the range from Tm to Tm+150° C. and preferably from Tm to Tm+100° C., Tm being the melting point of the polyester, measured according to the DSC method of standard ISO 11357;
  in the case of an amorphous polyester, at a temperature in the range from Tg to Td and preferably from Tg+50° C. to 300° C., Tg being the glass transition temperature of the polyester, measured according to the DSC method of standard ISO 11357, Td being the decomposition temperature of the polyester measured by thermogravimetric analysis under nitrogen and corresponding to the temperature for which the loss of mass of the polyester is greater than 50%, at a temperature increase of 10° C. per minute.

Preferably, the blending temperature is within the range from 200 to 260° C. in the case of a semicrystalline polyester, and from 100° C. to 300° C. in the case of an amorphous polymer.

The blending is performed for a time sufficient for the inherent viscosity of the blended polyester to be less than 0.5 dl/g.

For the purposes of the invention, the term "alcohol" means a compound of linear or branched, saturated or unsaturated alkyl type bearing at least one —OH function, such as ethanol, methanol, n-butanol or heptanol (derived from castor oil plant), and preferably biosourced.

Preferably, the alcohol is a polyol, i.e. a compound of linear, branched or cyclic, saturated or unsaturated alkyl type bearing at least two —OH functions on the alkyl chain, and also polymers (polyethers) of these polyhydroxylated alkyl compounds. Preferably, it is an alkyl compound containing from 2 to 12 carbon atoms and even more preferentially from 2 to 8 carbon atoms. Advantageously, this alkyl compound comprises 2 or 3 carbon atoms. Polyols have a higher boiling point than monoalcohols and may be used in extrusion devices; they have the advantage of not making it necessary to work at low temperature under pressure (autoclave). Furthermore, they are standard ingredients of cosmetics.

The polyols used according to the invention are especially chosen from: glycerol, ethylene glycol, propylene glycol, butanediol, hexaglycerol, dipropylene glycol, isosorbide, sorbitol, and polymers comprising them, and mixtures thereof. Among the polyols that may be used according to the invention, mention may also be made of: hexylene glycol, butylene glycol, pentylene glycol, butyldiglycol and 1,2,3-trihydroxyhexane, and mixtures thereof.

Preferably, said polyols are chosen from glycerol and sorbitol, and mixtures thereof.

The term "carboxylic acid" means a linear, branched or cyclic, saturated or unsaturated C4-C50 compound comprising at least one acid function.

The term "polycarboxylic acid" means a linear, branched or cyclic, saturated or unsaturated C4-C50 compound comprising at least two acid functions.

Preferably, the carboxylic acids are chosen from hydroxy acids such as glycolic acid, lactic acid, 3-hydroxypropionic acid, 4-hydroxybutyric acid, 3-hydroxyisovaleric acid and citric acid, and mixtures thereof.

Preferably, said compound used in the process of the invention is chosen from glycerol, sorbitol and lactic acid, and mixtures thereof. Said compound is advantageously a mixture of glycerol and of lactic acid, preferably in a substantially equal mass amount.

Preferably, said compound is derived from renewable sources and is produced if possible according to the principles of green chemistry, known to those skilled in the art. Said compound should also be thermally stable under the blending and milling conditions of the process. It is preferably chosen from the products having an INCI (International Nomenclature Cosmetic Ingredient) name that can be included in the composition of cosmetics. The INCI name is attributed by the Personal Care Products Council. The INCI names are published in the International Cosmetic Ingredient Dictionary and Handbook and must be used to establish the list of ingredients indicated on the packaging of cosmetic products in the United States, in the European Union and in other countries.

As a device for this depolymerization step, use may be made of any device for mixing, blending or extruding molten plastics known to those skilled in the art. Examples that may be mentioned include internal mixers, roll mixers, single-screw, counter-rotating or co-rotating twin-screw extruders, continuous co-kneaders, or stirred reactors. The blending device may be one of the tools mentioned above or a combination thereof, for instance a co-kneader combined with an uptake single screw, a co-rotating twin-screw combined with a gear pump, a reactor connected to an extruder, etc. The extrusion tool is generally configured so as to identify a polymer melting zone, a zone for mixing and reaction between the species present and a depressurization/degassing zone to remove the volatile compounds. These various zones may be materialized by the configuration of the screw of the tool, the use of a restriction zone or the coupling of tools. The device may also be equipped with a filtering system, preferably for continuous filtering, and a system for granulation with rods or under water adapted to the rheology of the aliphatic polyester by its geometry and its thermal characteristics or a polymer-melt spraying system, such as spray cooling. Examples that may be mentioned include the Werner 30 or Coperion ZSK30 extruder. Alternatively, use may be made of any suitable blender, such as a Brabender or Plastograph W50EHT blender, composed of a motor, a blending chamber, two rotors rotating in opposite directions at different speeds to ensure blending of the molten material, a thermocouple, and data acquisition.

Preferably, the blending step of the process according to the invention is performed in a gearing co-rotating twin-screw extruder. The reason for this is that it is a continuous process which allows greater production efficiency than a batch process. Furthermore, since the residence times in an extruder are shorter than in mixers (for example of Brabender type), the products are less subject to thermal oxidation, and in particular run less of a risk of undergoing yellowing.

In the present invention, and especially in the examples below, the inherent viscosity of the polyester is measured at a polyester concentration of 0.5% by weight as a solution in meta-cresol relative to the total weight of the solution, at 20° C., using an Ubbelohde viscometer.

The inherent viscosity of the polyester after blending is less than 0.5 dl/g, preferably less than 0.4 dl/g, preferably less than 0.3 dl/g, preferably in the range from 0.10 to 0.30 dl/g, preferably from 0.15 to 0.25 dl/g, or better still substantially equal to 0.2 dl/g.

According to the process of the invention, the blending step is thus maintained for a time sufficient for the inherent viscosity of the blended polyester to be less than 0.5, preferably sufficient for the viscosity to be in the range from 0.10 to 0.30, or better still from 0.15 to 0.25.

A blending time of 30 to 1800 seconds is generally sufficient. Preferably, the duration of the blending step is within the range from 30 seconds to 20 minutes, preferably from 30 seconds to 15 minutes. The blending time depends on the starting polyester, the content of polyol(s) and/or of carboxylic acid(s), the mixtures, the temperature and the blending tool used.

According to one embodiment of the process of the invention, said mixture during the blending step also comprises from 0.005% to 0.2% by weight of catalyst comprising at least one element from group IVB or IVA, such as Ti, Zr or Sn.

According to another embodiment of the process of the invention, said mixture may also be prepared in the presence of additives for modifying the characteristics of the powders, such as plasticizers (less than 20% by weight relative to the weight of the mixture), nucleating agents (less than 5%), waxes (less than 50%), fillers (less than 50%), stabilizers (less than 5%), organic compounds, or oligomers (less than 50%), especially silicones, polyolefins, fluoro polymers, such as PVDF, preferably with an inherent viscosity of less than 0.5.

Advantageously, the various steps of the process of the invention do not involve any solvent.

After said blending step, the process of the invention may optionally comprise:
- an optional intermediate "crystallization" step for developing the crystallinity of said polyester in order further to facilitate its subsequent milling; and/or
- an intermediate drying step in order to adjust the amount of organic impregnating agent(s), especially the amount of additives(s) or of compound(s), which preferentially correspond(s) to the compound(s) used in the depolymerization step: alcohol, especially polyol, and/or acid.

The crystallization step is performed by heating the polymer to a temperature between its Tg and before the start of melting of the polymer observed by DSC according to standard ISO 11357. Any type of device that is suitable for developing the crystallinity of a polyester may be used, such as a dryer, a reactor, etc.

The drying step is performed by heating the polymer to a temperature between its Tg and the start of melting of the polymer observed by DSC according to standard ISO 11357 at atmospheric pressure, or under vacuum. Any type of device that is suitable for drying a polymer may be used, such as a dryer, a reactor, an oven, a fluidized bed, etc.

After the optional preliminary blending step (and optionally crystallization), the process of the invention comprises a step of milling the aliphatic polyester with an inherent viscosity of less than 0.5 dl/g so as to obtain a fine powder of aliphatic polyester, the powder thus obtained having a volume-median diameter (d50) of less than 30 μm. The powder thus obtained is optionally impregnated with compound as defined above in the case where a blending step has been performed before the milling.

In the present invention and the present description, the mean (volume) diameters are determined from the particle size distribution measured using a Coulter Multisizer 3 or Coulter (R) LS230 granulometer, version 2.11a of the software, and according to standard ISO 13319.

Advantageously, the milling step according to the invention is performed at room temperature (i.e. between 15° C. and 25° C. approximately).

Milling makes it possible to obtain fine powder particles of rounded irregular shape and makes it possible to avoid the formation of sharp edges at the surface of the powder particles, which has an influence on the sensory properties, in particular the feel, of the powder obtained.

The milling device used in the process of the invention may be of any type that is suitable for manufacturing powders.

According to a preferred embodiment of the invention, the milling is performed solely by impacts between the grains of milled polyester, preferably using an opposite air-jet mill, by means of two opposite nozzles fed with compressed air, generally at a pressure of 6 to 9 bar, preferably at 7 bar ($7 \times 10^5$ Pa). The air preferably used is filtered and dried, and thus does not introduce any contaminant. Needless to say, any other suitable gas could replace the air feeding the nozzles. The polymer is conveyed and carried directly by the air leaving the nozzles. Under the effect of the opposite air jets, the polymer particles collide with each other, which reduces their granulometry and leads to their final characteristic irregular form without sharp edges. The dimensions of the milling system and the gas input rates used are adapted to obtain good fluidization and the desired granulometry. By way of example, the power consumed for the milling is about 1 to 2 kW.h/kg of powder.

This type of mill is commonly used and widespread in the polymer industry. An opposite air-jet mill is particularly suitable for the manufacture of very fine powders having narrow particle size distribution curves. Specifically, when compared with the relative speed of mechanical mills (impact mills: up to 140 m/s, counter-rotating mills: up to 250 m/s), the opposite air-jet mills used in the process of the invention allow much higher relative milling speeds, of greater than 400 m/s.

Advantageously, the opposite air-jet mill comprises an integrated classifier or selector, which is capable of directly adjusting the milling speed in order to obtain the desired granulometry, unlike other systems in which it is generally necessary to envision the addition in series of an ancillary adjusting device. The selector sends the particles of nonconforming diameter to the feed system of the milling chamber, while the particles whose granulometry conforms to the adjustment are collected in an air filter. The powder may be collected directly at the foot of this filter, for example in a bag. The only adjustments to be made according to the process of the invention are the milling speed to obtain the desired granulometry, and the feed rate to maintain a certain constant amount of product in the milling chamber. The milling speed may be adjusted directly on the selector and the transitions to change the granulometry of the powder during the process of the invention are extremely rapid. The use of such an opposite air-jet mill improves the production efficiency of the process of the invention.

Advantageously, the final granulometry of the polyester powder is controlled directly by adjusting the milling speed of the process. Preferably, the adjustment of the milling speed is made by means of a selector integrated into the mill.

After the milling step, the process of the invention may optionally also comprise an optional step of crystallization and/or drying of the powder obtained by milling.

The optional drying step makes it possible precisely to control the content (weight percentage) of compound impregnated into the powder obtained and also the properties of the powder, in particular its oil uptake.

For the purposes of the invention, the term "impregnated compound" means the result of the melt-blending of said compound with the polyester during the depolymerization step. The compound in fact becomes "impregnated" into the very matrix of the polymer, especially in the core of the powder particle obtained according to the process of the invention.

Drying leads to an increase in the crystallinity of the powder obtained. Conversely, crystallization, for example at temperatures close to the Tg, does not necessarily result in a loss of mass (i.e. no loss of impregnated compound).

The advantage of intermediate crystallization or intermediate drying, i.e. before milling, is to facilitate the milling step and to produce an even lower median diameter, for example less than 20 μm, or even less than 10 μm.

The advantage of drying after milling is to modulate the properties of the powder obtained, such as its degree of impregnation with compound, and its oil absorption and water absorption properties.

The advantage of crystallization after milling is to modulate the properties of the powder, especially the chemical resistance and the oil uptake, its mechanical properties, for example its compacting power; without, however, modifying its degree of impregnation.

To increase the degree of crystallinity of the polyester without modifying its degree of impregnation, the crystallization step is performed at a temperature between the glass transition temperature Tg and the crystallization temperature Tc of the polyester, and not under vacuum.

Advantageously, the degree of impregnation of the powder and the oil absorption properties of the powder are adjusted during the depolymerization and/or during the drying of the polyester.

A subject of the present invention is also a biosourced aliphatic polyester powder that may be obtained according to the process of the invention as described previously, in which the particles have a volume-median diameter of less than 30 μm, and are impregnated, preferably to a proportion of from 0.1% to 20% relative to the weight of the powder, with a compound chosen from alcohols (preferably polyols) and/or carboxylic acids, especially hydroxy acids.

This "degree of impregnation" corresponds to the result of the assay of the compound in the powder. This measurement of the "degree of impregnation" is a means for determining the content of compound that is in the core of the polymer matrix of the powder, and is readily measured by TGA (thermogravimetric analysis) under nitrogen, for example using a Netszsch TG209F1 machine.

Advantageously, the powder particles according to the invention have a volume-median diameter of less than 20 μm and preferably less than 10 μm.

Advantageously, the oil uptake (measured according to DIN standard ISO 787-5) of the powder according to the invention is in the range from 0.5 to 1 g/g of powder.

Advantageously, the powder according to the invention satisfies the directives of the cosmebio charter.

A subject of the present invention is also the use of powder according to the invention for the manufacture of cosmetic, pharmaceutical or perfumery compositions or products.

A product comprising the powder according to the invention is especially a colored, uncolored or transparent product chosen from the following products:
  makeup products for the human face and body, such as foundation, tinted cream, loose or compact powder, eyeshadow, mascara, eyeliner or lipstick;
  care products for the human face and body, such as cream, milk, lotion, mask, scrubbing product, cleansing and/or makeup-removing products, deodorants, antiperspirants, shaving products and hair-removing products;
  haircare products, such as shampoos, hair shaping products, hairstyle hold products, antidandruff products, products for combating hair loss, products for combating dryness of the hair, hair dyes and bleaching products;
  perfumery products, such as perfume and fragranced milk, cream or loose or compact powder.

EXAMPLES

The aliphatic polyesters used herein are polylactic acids (PLA), the characteristics of which are given in table 1.

These PLAs with a viscosity of greater than 0.5 dl/g cannot be milled directly into powders with a volume-median diameter of less than 30 μm.

PLAs were depolymerized so as to have an inherent viscosity of 0.5 dl/g, but did not make it possible either to obtain by simple milling (without a drying step) powders with a volume-median diameter of less than 30 μm.

The examples below, performed according to the process of the invention, show that with an inherent viscosity of less than (below) 0.5 dl/g, the same polyesters become millable into fine powders.

ing being lower, when compared with PLA PLE 005 (test 3). Furthermore, the process according to the invention makes it possible to depolymerize and to mill both an amorphous polyester and a semicrystalline polyester.

TABLE 1

| | Commercial name of the PLA | | | | | |
|---|---|---|---|---|---|---|
| | 2002 D | 4032 D | 6400 D | 4060 D | PLI 005 | PLE 005 |
| Density | 1.24 | 1.24 | 1.24 | 1.24 | 1.25 | 1.25 |
| Inherent viscosity (dl/g, 20° C., m-cresol) | 1.40-1.50 | 1.39 | 1.39 | 1.29 | 1.07 | 1.05-1.10 |
| Tg (° C.) | 63 | 61 | 61 | 58 | 48-50 | 48-50 |
| Tm (° C.) | 150 | 167 | 166 | amorphous | 145-155 | 155-160 |
| Supplier | | NatureWorks | | | NaturePlast | |

1) Blending Step:

Extruder Blending:

Tests 1 to 10 are performed in a Coperion ZSK30 extruder, at a screw speed of 300 rpm and at a throughput of 15 kg/h. The blended product is recovered at the die outlet, by means of a calendar, which cools the product and crushes it into polymer granules or "chips" about a millimeter in size, which are readily manipulable. Needless to say, any other device, for example a spray cooling device, may be used to manufacture granules from the blended product.

After this step, the samples obtained are analyzed to determine their inherent viscosity.

The table below indicates the inherent viscosity obtained by varying the temperature, the nature of the PLA and the alcohol content during the blending step.

The temperature conditions and the amount of compound used in the process of the invention make it possible rapidly to reach the desired viscosity (i.e. a viscosity of less than 0.50, or even less than 0.3), while at the same time avoiding substantial thermal oxidation (which is the cause of yellowing of the polyester) which may be brought about by excessively high temperatures.

2) Step of milling of the depolymerized samples

The product is introduced into the mill by means of a Venturi-effect air-jet tube. In the milling chamber, the product is subjected to a violent and rapid turbulence effect with compressed air at 7 bar caused by the distribution ring pierced with tangential holes (vortex effects). Milling takes place solely by impacts between the grains of the product.

TABLE 2

| Tests | Sample | Type of PLA | % | Alcohol | % | Blending temperature (° C.) | Inherent viscosity (dl/g) |
|---|---|---|---|---|---|---|---|
| 1 | 397 | PLA PLE 005 | 90 | Glycerol | 10 | 240 | 0.49-<0.50 |
| | 400 | PLA PLE 005 | 90 | Glycerol | 10 | 260 | 0.20-0.22 |
| | 399 | PLA PLE 005 | 80 | Glycerol | 20 | 240 | 0.23-0.25 |
| | 398 | PLA PLE 005 | 80 | Glycerol | 20 | 260 | 0.16-0.15 |
| 2 | 401 | PLA PLE 005 | 85 | Glycerol | 15 | 250 | 0.16-0.17 |
| | 402 | PLA PLE 005 | 85 | Glycerol | 15 | 250 | 0.21-0.22 |
| | 403 | PLA PLE 005 | 85 | Glycerol | 15 | 250 | 0.23-0.20 |
| 3 | 404 | PLA PLE 005 | 85 | Mixture* | 15 | 250 | 0.24-0.22 |
| 4 | 405 | PLA 2002D | 85 | Glycerol | 15 | 250 | 0.12-0.14 |
| 5 | 406 | PLA 4060D | 85 | Glycerol | 15 | 250 | 0.13-0.15 |

*mixture: lactic acid/glycerol (50/50)

A viscosity of less than 0.5 and even less than 0.30 is obtained on most of the blended products.

Tests No. 1 make it possible to observe the influence of the temperature on the degradation. For an equivalent blending time, the higher the blending temperature, the greater the depolymerization, and the viscosity of the PLA decreases. The amount of compound (glycerol) introduced also acts on the depolymerization of the polymer. The greater the amount of glycerol, the more the viscosity of the PLA decreases.

The reproducibility tests (tests No. 2) show reproducible results (standard deviation=0.03).

By comparing the effect of glycerol with the effect of the lactic acid/glycerol mixture on depolymerization in an extruder, it is noted that glycerol alone allows a better decrease of the viscosity of the polymer (tests 2 compared with test 3) during blending.

The tests performed on PLA 2002 D and 4060 D (tests 4 and 5) show that, under the same conditions, these aliphatic polyesters degrade more, their viscosity obtained after blend- The Venturi feed nozzle of the mill has here a diameter of 2.5 mm; if the polyester obtained after depolymerization or if the polyester with an inherent viscosity of less than 0.5 dl/g is not in the form of granules or chips about a millimeter in size, before milling the polyester with the air-jet mill, it is preferable to crush it, after solidification (cooling) if necessary, for example using a Retch mill equipped with a 2 mm grate. Alternatively, any device may be used, especially a spray cooling device for manufacturing granules or powder with a coarseness of about 1 millimeter.

Once the products have been milled according to the process of the invention, the granulometry is evaluated with a Coulter Multisizer 3 granulometer. The compacting of the particles one by one and their volumetric detection are obtained via the Coulter principle. This technique is based on measurement of the variation in resistance induced by the passage through a calibrated orifice of particles suspended in an electrolyte. Each insulating particle passing through the detection orifice displaces a volume of electrolyte equivalent to its own volume and brings about a reduction of the volume of electrolyte present in the orifice. This reduction brings about a sudden increase in the electrical resistance. The variation in resistance is proportional to the volume of electrolyte displaced and, consequently, to the volume of the particle. The resistance variations are transformed into voltage pulses, the height of which is proportional to the volume of the particle. These pulses are amplified and classified as a function of their height in the various channels of the analyzer.

Definition of the statistical parameters measured:

| Parameters | Definition |
|---|---|
| Mean: | Volume-mean diameter of the particles |
| Median: | Volume-median diameter of the particles: value which divides an ordered numerical series into two parts of the same number of elements |
| Mode: | Value the most represented in a statistical population |
| C.V. | Coefficient of variation, normalized measurement of the dispersion of a probability distribution |

Case A: the samples (in this case Nos 401 and 405) are milled directly, i.e. without an intermediate crystallization or drying step.

The granulometry results presented in table 3 below show that the aliphatic polyester samples, derived from the blending step according to the invention, are indeed millable into particles with a median diameter of less than 30 μm.

TABLE 3

|  | 401 | 405 |
|---|---|---|
| Mean: | 25.0 μm | 27.0 μm |
| Median: | 25.6 μm | 27.8 μm |
| Mode: | 30.3 μm | 45.4 μm |
| C.V.: | 61.4% | 60.3% |

Case B: the samples are ground after an intermediate drying step.

This embodiment of the process of the invention shows the influence of the intermediate drying step, between the blending step and the milling step, on the granulometry of the powders obtained after milling.

The drying is performed by stoving the blended polymers at a temperature of 100° C. for 24 hours, under vacuum.

The blended and dried polymers are then milled.

The granulometry results measured on several milled samples starting with polymers with different viscosities (table 1) and then dried, are given in table 4 below.

TABLE 4

|  | PLE 005 | | | | | | PLA 2002 D |
|---|---|---|---|---|---|---|---|
|  | 401 | 400 | 403 | 404 | 399 | 397 | 405 |
| $V_{int}$ (dl/g) | 0.16 | 0.21 | 0.22 | 0.23 | 0.24 | <0.5 | 0.13 |
| Mean: | 8.2 μm | 9.7 μm | 23.7 μm | 26.5 μm | 23.5 μm | 26.8 μm | 10.6 μm |
| Median: | 7.3 μm | 9.0 μm | 23.8 μm | 27.0 μm | 23.9 μm | 25.1 μm | 9.1 μm |
| Mode: | 6.7 μm | 9.3 μm | 62.1 μm | 34.1 μm | 45.4 μm | 21.1 μm | 52.9 μm |
| C.V.: | 95.00% | 82.70% | 64.10% | 62.30% | 62.00% | 69.80% | 92.00% |

If a comparison is made between tests 401 and 405, which have undergone a drying step before milling (case 2), and the tests that have not undergone drying before milling (case 1), it is noted that stoving makes it possible to further decrease the polyester particle size, which falls from an average of 26 μm (without stoving) to 8 μm (with stoving).

DSC measurements, collated in table 5, are taken according to standard ISO 11357, using the DSC TA Q2000 machine with Intracooler cooling, with the following parameters: 1: Equilibrate at −20.00° C., 2: Ramp 20.00° C./min to 240.00° C., 3: Ramp 20.00° C./min to −20.00° C., and 4: Ramp 20.00° C./min to 240.00° C.

TABLE 5

|  | DSC | | | TGA |
|---|---|---|---|---|
|  | Tg | Tm | Heat of fusion (J/g) | Estimation of the volatiles content |
| 397 | 51 | 135 | 9 | 8.4% |
| 397 after 2 h at 100° C. under vacuum | 49 | 137 | 41 | 5.0% |
| 397 after 5 h at 100° C. under vacuum | 49 | 137 | 43 | 3.9% |
| 397 after 20 h at 100° C. under vacuum | 50 | 139 | 42 | 2.5% |

Since the heat of fusion is linked to the degree of crystallinity of the polyester (the more the heat of fusion increases, the more the crystallinity increases), the data of table 5 show that the drying at 100° C. of test 397 brings about crystallization of the PLA and also partial removal of the glycerol.

Other tests showed that it is possible to crystallize at 60° C. and without vacuum, without, however, resulting in "drying", i.e. without removal of the glycerol.

Without wishing to be bound by a theory, the inventors consider that the increase in the crystallinity of the polymers might act on the millability, i.e. on their capacity to be milled into the finest possible particles.

The process of the invention makes it possible to mill PLA to obtain PLA powder particles with a volume-median diameter of less than 30 μm, or even less than 20 μm and better still less than 10 μm, as in the case of tests 401, 404 and 405.

Table 6 below indicates the degree of impregnation with compound (glycerol or a glycerol/lactic acid mixture) measured on powders obtained according to the process of the invention, by the loss of mass at 290° C. by thermogravimetric analysis (TGA), under nitrogen, by increasing the temperature by 10° C. per minute, using a Netszsch TG 209F1 machine:

TABLE 6

|  | 397 | 399 | 400 | 401 | 403 | 404 | 405 |
|---|---|---|---|---|---|---|---|
| Content of glycerol initially added % | 10 | 20 | 10 | 15 | 15 | 15* | 15 |

TABLE 6-continued

| | 397 | 399 | 400 | 401 | 403 | 404 | 405 |
|---|---|---|---|---|---|---|---|
| % Volatiles content by TGA (loss of mass at 290° C.) | 8 | 17 | 7.8 | 13.4 | 12 | 8 | 10.5 |

It is confirmed that there is a correlation between the content of compound added during the blending step and the degree of impregnation with glycerol of the powders obtained according to the process of the invention.

Oil uptake measurements according to NF standard ISO 787-5 were performed (samples obtained according to the process of the invention with intermediate drying, case B):

The oil uptake (g/g) of test 400 is 0.55 g/g.

The oil uptake (g/g) of test 405 is 0.80 g/g.

The fine biosourced powders according to the invention have the advantage of dispersing both in oily phases and in aqueous phases. The formulation of cosmetics with these powders is thus facilitated.

The invention claimed is:

1. A process for manufacturing a biosourced aliphatic polyester powder with a volume-median diameter of less than 30 μm according to standard ISO 13319, comprising:
   a—a step of providing an aliphatic polyester with an inherent viscosity of less than 0.5 dl/g measured at a polyester concentration of 0.5% by weight dissolved in meta-cresol relative to the total weight of the solution, at 20° C. using an Ubbelohde viscometer;
   b—a step of milling said polyester so as to obtain a polyester powder with a volume-median diameter of less than 30 μm.

2. The process as claimed in claim 1, in which step a comprises:
   a step of depolymerization of an aliphatic polyester with an Mn of greater than 30 000 g/mol to obtain an aliphatic polyester with an inherent viscosity ($v_{inh}$) of less than 0.5 dl/g.

3. The process as claimed in claim 2, in which the depolymerization step is performed by blending a mixture comprising the polyester and 0.1% to 20% by weight of a compound chosen from alcohols, preferably polyols, and/or carboxylic acids, relative to the total weight of the mixture,
   said mixture being subjected:
   in the case of a semicrystalline polyester, to a temperature in the range from Tm to Tm+150° C., Tm being the melting point of the polyester, measured according to the DSC method of standard ISO 11357;
   in the case of an amorphous polyester, to a temperature in the range from Tg to Td and preferably from Tg+50° C. to 300° C., Tg being the glass transition temperature of the polyester, measured according to the DSC method of standard ISO 11357, Td being the decomposition temperature of the polyester measured by thermogravimetric analysis and corresponding to the temperature for which the loss of mass of the polyester is greater than 50%, under nitrogen and at a temperature increase of 10° C. per minute;
   and the blending being performed for a time sufficient for the inherent viscosity of the blended polyester to be less than 0.5 pl/g.

4. The process as claimed in claim 3, in which the blending step is performed for a time sufficient for the polyester to have an inherent viscosity in the range from 0.10 to 0.30 dl/g and preferably from 0.15 to 0.25 dl/g.

5. The process as claimed in claim 1, characterized in that it comprises a step i of crystallization and/or drying of said polyester, said step being intermediate between step a and step b and/or performed after step b.

6. The process as claimed in claim 1, in which the biosourced aliphatic polyester is chosen from:
   PLAs: polylactic acids obtained by polycondensation of lactic acid or by ring opening of lactides (various isomers) including the stereocomplexes poly(D-lactic acid) and poly(L-lactic acid) obtained by mixing or in the form of block polymers;
   copolymers of PLA with glycolic acid (or glycolide);
   poly(hydroxycarboxylic acids) comprising polymerized units of one or more hydroxycarboxylic acids chosen from: 6-hydroxyhexanoic acid, 3-hydroxyhexanoic acid, 4-hydroxyhexanoic acid, 3-hydroxyheptanoic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid;
   poly(ε-caprolactone);
   aliphatic polyesters obtained by polycondensation of diols and of diacids such as poly(butylene adipate) and poly(butylene adipate-co-succinate);
   and mixtures thereof.

7. The process as claimed in claim 3, in which said alcohols are chosen from: glycerol, ethylene glycol, propylene glycol, butanediol, hexaglycerol, dipropylene glycol, isosorbide, sorbitol, and polymers comprising them, hexylene glycol, butylene glycol, pentylene glycol, butyldiglycol and 1,2,3-trihydroxyhexane, and mixtures thereof;
   and/or the carboxylic acids are chosen from hydroxy acids such as glycolic acid, lactic acid, 3-hydroxypropionic acid, 4-hydroxybutyric acid, 3-hydroxyisovaleric acid and citric acid, and mixtures thereof.

8. The process as claimed in claim 3, characterized in that said compound is chosen from glycerol, sorbitol and lactic acid, and mixtures thereof.

9. The process as claimed in claim 1, in which the milling is performed using an opposite air-get mill.

10. The process as claimed in claim 3, characterized in that said mixture during the blending step also comprises from 0.005% to 0.2% by weight of catalyst comprising at least one element from group IVB and IVA, such as Ti, Zr or Sn.

11. The process as claimed in claim 1, characterized in that its steps do not involve any solvent.

12. A biosourced and biodegradable aliphatic polyester powder that is obtained according to the process of claim 1, in which the particles have a volume-median diameter of less than 30 μm, and are impregnated with a compound chosen from polyols and/or carboxylic acids.

13. The powder as claimed in claim 12, characterized in that the particles have a volume-median diameter of less than 20 μm and preferably less than 10 μm.

14. The powder as claimed in claim 12, characterized in that its oil uptake, measured according to DIN standard ISO 787-5, is in the range from 0.5 to 1 g/g of powder.

15. A method for the manufacture of cosmetic, pharmaceutical or perfumery products, which comprises incorporating a powder of claim 12 into the product.

* * * * *